(12) United States Patent
Owen et al.

(10) Patent No.: US 8,659,923 B2
(45) Date of Patent: Feb. 25, 2014

(54) SYSTEM AND METHOD FOR CONVERTING AC POWER TO DC POWER USING SENSORLESS FIELD ORIENTED CONTROL

(75) Inventors: Justin L. Owen, Harvest, AL (US); Jeffrey C. Strouse, Owens Cross Road, AL (US); Michael J. Marcel, Madison, AL (US)

(73) Assignee: DRS Test & Energy Management, LLC, Huntsville, AL (US)

( * ) Notice: Subject to any disclaimer, the term of this patent is extended or adjusted under 35 U.S.C. 154(b) by 356 days.

(21) Appl. No.: 13/028,026

(22) Filed: Feb. 15, 2011

(65) Prior Publication Data

US 2012/0206949 A1  Aug. 16, 2012

(51) Int. Cl.
H02M 7/217 (2006.01)
(52) U.S. Cl.
USPC .................................. 363/81; 363/84; 322/28
(58) Field of Classification Search
USPC ............................................ 363/81, 84; 322/28
See application file for complete search history.

(56) References Cited

U.S. PATENT DOCUMENTS

| | | | |
|---|---|---|---|
| 5,495,162 A | 2/1996 | Rozman et al. | |
| 6,278,196 B1 | 8/2001 | Ehrhart et al. | |
| 6,567,282 B1 | 5/2003 | Kikuchi et al. | |
| 6,583,995 B2 * | 6/2003 | Kalman et al. | 363/35 |
| 7,072,790 B2 | 7/2006 | Hu et al. | |
| 7,307,404 B2 * | 12/2007 | Mellor et al. | 322/46 |
| 7,372,174 B2 * | 5/2008 | Jones et al. | 290/44 |
| 2009/0097292 A1 | 4/2009 | Reichard et al. | |
| 2010/0237817 A1 * | 9/2010 | Liu et al. | 318/400.34 |

OTHER PUBLICATIONS

Burgos et al. "Design and Evaluation of a PLL-Based Position Controller for Sensorless Vector Control of Permanent-Magnet Synchronous Machines," IEEE 32nd Annual Conference on Industrial Electronics, IECON 2006, pp. 5081-5086 (Nov. 2006).

Chi et al. "A Novel Sliding Mode Observer with Adaptive Feedback Gain for PMSM Sensorless Vector Control," IEEE Power Electronics Specialists Conference, 2007. PESC 2007, pp. 2579-2585 (Jun. 2007).

Fatu et al. "I-F starting method with smooth transition to EMF based motion-sensorless vector control of PM synchronous motor/generator," IEEE Power Electronics Specialists Conference 2008 PESC 2008, pp. 1481-14817 (Jun. 2008).

Li et al. "A robust sliding mode observer for permanent magnet synchronous motor drives," IECON 02, IEEE 2002 28th Annual Conference of the Industrial Electronics Society pp. 1014-1019 (Nov. 2002).

Liangliang et al. "A novel sensorless control strategy of PMSM based on slide-mode observer and SVPWM," 7th World Congress on Intelligent Control and Automation, WCICA 2008, pp. 7726-7731 (Jun. 2008).

* cited by examiner

Primary Examiner — Harry Behm
(74) Attorney, Agent, or Firm — Kilpatrick Townsend & Stockton LLP (57) ABSTRACT

High voltage DC power, which is produced by rectifying AC power generated by an AC generator, is controlled and regulated without the need for measuring the position of the rotor with hardware. A Field oriented controller uses a sliding mode observer to estimate the position of the rotor without the use of position detection hardware. The estimated position of the rotor and the AC current are then used by the field oriented controller algorithm to regulate a DC output from a rectifier driven by an AC generator.

25 Claims, 6 Drawing Sheets

SYSTEM AND METHOD FOR CONVERTING AC POWER TO DC POWER USING SENSORLESS FIELD ORIENTED CONTROL

BACKGROUND

The present invention relates to power generation and more particularly to improved control systems and methods for converting alternating current (AC) power to direct current (DC) power.

AC generators convert mechanical energy, which can be produced by gasoline or diesel motors, into electrical energy. Since AC generators convert mechanical energy generated by gasoline and diesel motors into electrical energy and gasoline or diesel motors are easy to operate as stand alone units, portable generators typically include an AC generator connected to a gasoline or diesel motor. Since many devices are configured to run on DC power, the AC power generator can be configured with an inverter/rectifier which converts AC power to DC power.

Some applications require DC power sources that have a stable regulated voltage. Converting AC power into DC power for these applications can be difficult because the speed of the motor driving the AC generator can vary by several thousand revolutions per minute (rpm), which can significantly affect the output of the AC generator. Since the generator's output AC voltage varies with speed, the AC generator must boost the voltage at the low end of the speed range and reduce the AC voltage at the high end of the speed range to compensate for variations in the motor's speed. Typically, a control algorithm is used to regulate the DC output voltage. These control algorithms usually require that the generator's rotor position be known in order to regulate a high voltage DC output. Traditional systems use a rotor position feedback device (hardware) such as optical encoders or mechanical sensors to obtain the rotor position. However, optical encoders and mechanical sensors have proven to be costly to implement and decrease overall system reliability.

Since a generator's rotor position and sometimes rotor speed, is required as an input to most algorithms that control and regulate the high voltage DC output, and since devices that measure the rotor position or speed are costly and effect reliability, it is difficult to provide a cost effective reliable portable high voltage DC power source. Therefore, what is needed is a system and method for regulating high voltage DC power output that does not rely on using sensors to measure a rotor's position or speed. A generator that does not rely on using sensors to measure the rotor's position or speed will be more cost effective and have increased reliability because of the elimination of sensors and related design elements.

BRIEF SUMMARY

Embodiments provide techniques for controlling a generator to provide stable regulated high voltage DC power without the need for measuring the position of the rotor with hardware. An AC generator, which is spun by a motor, generates AC current which is transmitted to an inverter/rectifier. The AC current is measured and the measured values are sent to a field oriented controller. The Field oriented controller uses a sliding mode observer to estimate the position of the rotor without the use of position detection hardware such as Hall effect device sensors mounted on the generator or motor. The estimated position of the rotor and the AC current are then used by the field oriented controller algorithm to generate a stable regulated DC power output.

In one embodiment, a method for generating a stable regulated DC power output includes producing an alternating current (AC) power using a generator, measuring an AC current produced by the generator, estimating, without directly measuring the rotor position, a rotor position of the generator using a sliding mode observer, calculating a control value for adjusting a rectifier, and rectifying the AC power according to the control value to produce a DC power. The control value is calculated using the estimated rotor position and the measured AC current. The generator can be a three phase generator.

In another embodiment, the method for generating a stable regulated DC power output further includes measuring a DC output voltage produced by the rectifier. Estimating the rotor position of the generator using a sliding mode observer further includes computing the duty cycle of each leg of the AC power produced by the generator, estimating an AC voltage produced by the generator using the computed duty cycles and the measured DC output voltage produced by the rectifier, estimating a back electromotive force (EMF) using the sliding mode observer that uses the estimated AC voltages, and estimating the rotor position using the estimated back EMF. The method can further include estimating the rotor speed. Adjusting the rectifier can further include adjusting the duty cycle on each leg of the rectifier using pulse width modulation (PWM).

In yet another embodiment, calculating the control value for adjusting the rectifier further includes transforming the measured three phase AC current into a two-dimensional stationary reference using a Clarke Transform, and transforming the two-dimensional stationary reference into a rotating reference using a Park Transform that uses the rotor position. The rotating reference can be a direct-quadrature frame. The method can further include transforming the rotating reference using an Inverse Park transform whose output goes to a Space Vector Pulse Width Modulation (SVPWM) switch. Rectifying the AC power can further include adjusting the duty cycle with PWM to optimize power output and reduce error.

In yet another embodiment, rectifying the AC power further includes adjusting the gain using an adaptive gain algorithm based on the speed of the shaft of the generator.

In another embodiment, a system for generating DC power includes an AC generator for producing AC power characterized by an AC current and an AC voltage, an ammeter that measures the AC current produced by the generator, a rectifier that coverts the AC power into DC power, and a field oriented controller that adjusts the rectifier to operate efficiently. The field oriented controller includes a memory device having instructions that, when executed cause the field oriented controller to estimate a rotor position of the generator using a sliding mode observer that does not directly measure the rotor position, and provide an adjustment to the rectifier that is based on the estimated rotor position and the measured AC current. The AC generator can be a three phase generator and the memory device that includes instructions can be a computer readable medium.

In yet another embodiment, the system for generating DC power further includes a voltmeter that measures a DC output voltage produced by the rectifier. The instructions that estimate the rotor position of the generator further include instructions that cause the field oriented controller to compute the duty cycle of each leg of the AC power produced by the generator, estimate an AC voltage produced by the generator using the computed duty cycles and the measured DC output voltage produced by the rectifier, estimate a back EMF using the sliding mode observer that uses the estimated AC voltages, and estimate the rotor position using the estimated back EMF. The instructions can further include instructions that cause the field oriented controller to estimate the rotor speed. The instructions that provide an adjustment to the rectifier can also further include instructions that cause the field oriented controller to adjust the duty cycle on each leg of the rectifier using PWM.

In yet another embodiment, the instructions that provide an adjustment to the rectifier further include instructions that cause the field oriented controller to transform the measured three phase AC current into a two-dimensional stationary reference using a Clarke Transform, and transform the two-dimensional stationary reference into a rotating reference using a Park Transform that uses the rotor position. The rotating reference can be a direct-quadrature frame. The instructions that provide an adjustment to the rectifier can further include instructions that cause the field oriented controller to transform the rotating reference using an Inverse Park transform whose output goes to a SVPWM switch. The instructions that provide an adjustment to the rectifier can also further include instructions that cause the field oriented controller to adjust the duty cycle using PWM to optimize power output and reduce error.

In yet another embodiment, the instructions that provide an adjustment to the rectifier further include instructions that cause the field oriented controller to adjust the gain using an adaptive gain algorithm based on the speed of the shaft of the generator.

In another embodiment, a system for generating DC power includes an AC generator for producing AC power characterized by an AC current and an AC voltage, an ammeter that measures the AC current produced by the generator, a rectifier that coverts the AC power into DC power, and a field oriented controller that adjusts the rectifier to operate efficiently. The field oriented controller includes logic that causes the field oriented controller to estimate the rotor position of the generator using a sliding mode observer that does not directly measure the rotor position, and provide an adjustment to the rectifier that is based on the estimated rotor position and the measured AC current. The AC generator can be a three phase generator. The logic can be a circuit or a set of instructions executable by a processor. The set of instructions can be stored in a memory that is accessible by the processor.

In yet another embodiment, the system for generating DC power further includes a voltmeter that measures a DC output voltage produced by the rectifier. The logic that causes the field oriented controller to estimate the rotor position of the generator further includes logic that causes the field oriented controller to compute the duty cycle of each leg of the AC power produced by the generator, estimate an AC voltage produced by the generator using the computed duty cycles and the measured DC output voltage produced by the rectifier, measure a DC output voltage produced by the rectifier, estimate a back EMF using the sliding mode observer that uses the estimated AC voltages, and estimate the rotor position using the estimated back EMF. The logic can further include logic that causes the field oriented controller to estimate the rotor speed. The logic that provides an adjustment to the rectifier can also further include logic that causes the field oriented controller to adjust the duty cycle on each leg of the rectifier using PWM.

In yet another embodiment, the logic that provides an adjustment to the rectifier further includes logic that causes the field oriented controller to transform the measured AC current into a two-dimensional stationary reference using a Clarke Transform, and transform the two-dimensional stationary reference into a rotating reference using a Park Transform that uses the rotor position. The rotating reference can be a direct-quadrature frame. The logic that provides an adjustment to the rectifier can further include logic that causes the field oriented controller to transform the rotating reference using an Inverse Park transform whose output goes to a SVPWM switch. The logic that provides an adjustment to the rectifier can also further include logic that causes the field oriented controller to adjust the duty cycle using PWM to optimize power output and reduce error.

In yet another embodiment, the logic that provides an adjustment to the rectifier further includes logic that causes the field oriented controller to adjust the gain using an adaptive gain algorithm based on the speed of the shaft of the generator.

BRIEF DESCRIPTION OF THE DRAWINGS

A further understanding of the nature and advantages of the disclosure may be realized by reference to the remaining portions of the specification and the drawings, presented below. The figures are incorporated into the detailed description portion of the disclosure. Like reference numerals refer to the same items throughout the Figures.

DETAILED DESCRIPTION

In the following description, for the purposes of explanation, specific details are set forth in order to provide a thorough understanding of the disclosure. However, it will be apparent that the disclosure may be practiced without these specific details. The disclosure describes advanced techniques that are programmed into a controller that allow a generator to provide stable regulated high voltage DC power without the need for measuring the position of the rotor with hardware. An AC generator, which is spun by a motor, generates AC current which is transmitted to a field oriented controller. The field oriented controller uses a sliding mode observer to estimate the position of the rotor without the use of position detection hardware, such as Hall effect device sensors mounted on the generator or motor. The estimated position of the rotor and the AC current are then used by the field oriented controller algorithm to regulate and stabilize the DC power output from an inverter/rectifier that converts the AC power into DC power.

Embodiments provide systems and methods for rectifying a three-phase AC input power from a variable speed generator to a regulated high voltage DC output power. A field oriented controller is used to tightly regulate the DC output voltage over a generator's operating speed range. As the generator's output AC voltage varies with speed, the field oriented controller boosts the voltage at the low end of the speed range and reduces the AC voltage at the high end of the speed range to compensate for variations in the motor's speed. The field oriented controller uses a sensorless rotor position detection algorithm (implemented solely in software or logic) to accurately estimate the rotor position based on existing, measurable generator parameters. The field oriented controller does not require the use of any hardware position measuring devices to determine the rotor position or speed. The system's reliability is therefore increased, and the cost of implementation is decreased without additional hardware. The sensorless algorithms (programmed in software or logic) use advanced control methods such as "sliding mode observers" and "adaptive gain algorithms" to predict the position of the rotor instead of using hardware.

Embodiments include systems and methods for generating a stable regulated DC power output that includes producing an AC power using a generator, measuring an AC current produced by the generator, estimating a rotor position of the generator using a sliding mode observer, calculating a control value for adjusting a rectifier, and rectifying the AC power according to the control value to produce a DC power output. The control value is calculated using the estimated rotor position and the measured AC current. The generator can be a three phase generator. The DC output voltage produced by the rectifier can also be measured. The rotor position of the generator can be estimated by computing the duty cycle of each leg of the AC power produced by the generator, estimating an AC voltage produced by the generator using the computed duty cycles and the measured DC output voltage produced by the rectifier, estimating a back EMF using the sliding mode observer that uses the estimated AC voltages, and estimating the rotor position using the estimated back EMF. The rotor speed can also be estimated. The rectifier can be adjusted by adjusting the PWM duty cycle on each leg of the rectifier.

The control value for adjusting the rectifier is determined by transforming the measured AC current into a two-dimensional stationary axis using a Clark Transform, and transforming the two-dimensional stationary axis into a rotating reference using a Park Transform that uses the rotor position. The rotating reference can be a direct-quadrature frame. The rotating reference can be transformed using an Inverse Park transform whose output goes to a SVPWM switch. The AC power can be rectified by adjusting the duty cycle using PWM to optimize power output and reduce error and/or by adjusting the gain using an adaptive gain algorithm based on the speed of the shaft of the generator.

Figure 1A:
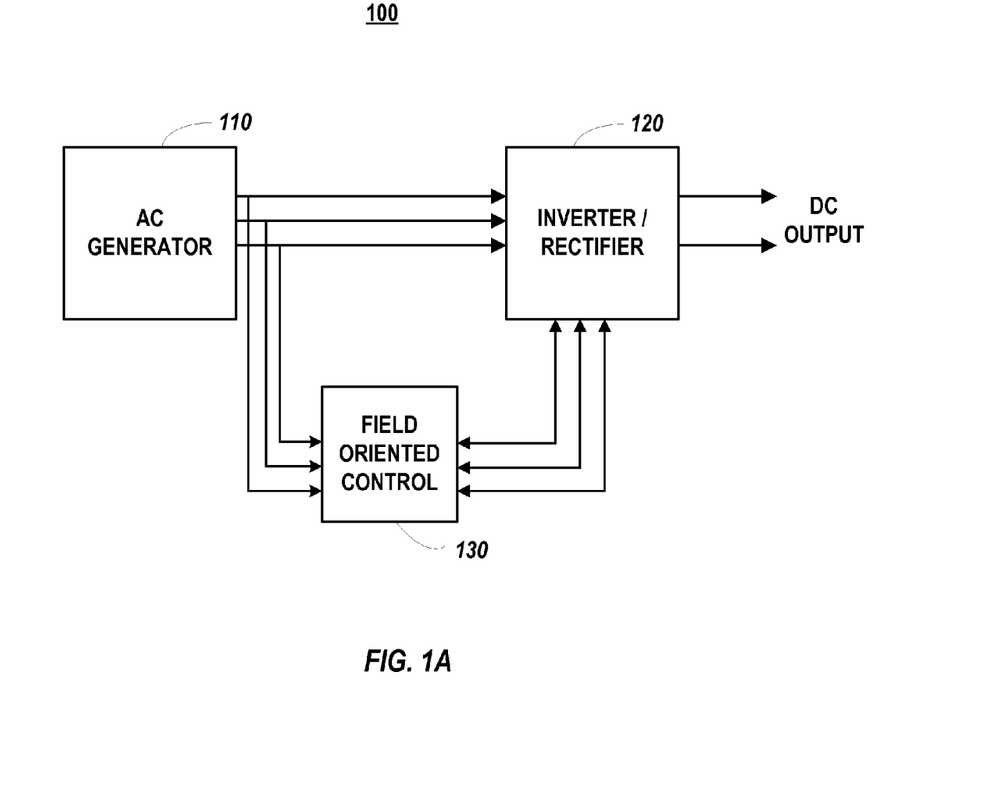
FIG. 1A is a block diagram illustrating a high level view of a system that incorporates an embodiment.

FIG. 1A is a block diagram illustrating a high level view of a system 100 that generates AC power characterized by an AC voltage and an AC current, rectifies the AC power, and outputs DC power having a DC current and DC voltage without using hardware to measure the rotor position of a generator. The system 100 includes an AC generator 110, an inverter/rectifier 120, and a field oriented controller 130. The AC generator 110, which can be a three-phase generator, converts mechanical energy into electrical energy by mechanically rotating a rotor that is mounted within a stationary stator. The mechanical energy can be produced by a gasoline, diesel, natural gas, water, steam, or nuclear motor that spins a shaft which turns the rotor of the AC generator 110. The inverter/rectifier 120 can convert AC power to DC power using various techniques such as switching or rectification. Conversion by switching involves using Insulated Gate Bipolar Transistors (IGBT) or metal oxide semiconductor field effect transistors (MOSFET) that are turned ON and OFF according to control signals received from the field oriented controller 130 so that only DC power is output. Conversion by rectification involves using diodes, such as Schottky diodes, that conduct electric current in only one direction.

The field oriented controller 130 receives inputs from both the AC generator 110 and the inverter/rectifier 120, which are used to generate signals that are used to adjust the inverter/rectifier 120 to produce DC power. The field oriented controller 130 uses a sliding mode observer technique to calculate inverter/rectifier adjustments. The sliding mode observer used by the field oriented controller 130 bases its output (or control signal) on the estimated rotor position and the measured AC current. The rotor position is estimated by performing calculations without measuring the rotor position, which typically requires the use of sensors such as hall sensors that are mounted on the AC generator.

Figure 1B:
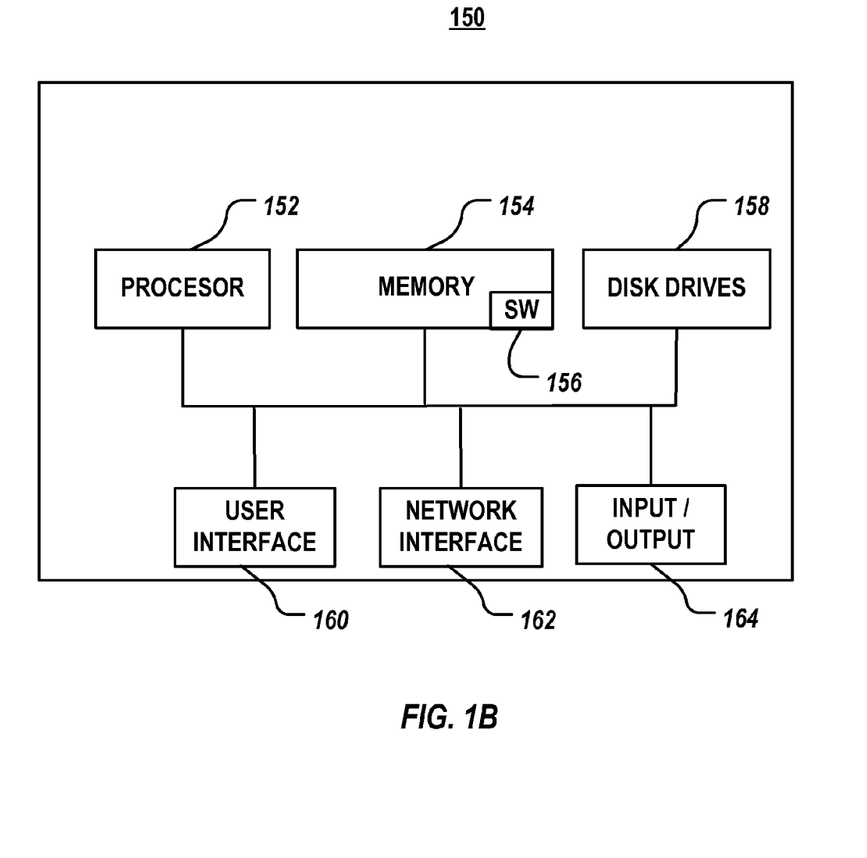
FIG. 1B is a block diagram illustrating a computer system used in the field oriented controller 130 in accordance with an embodiment.

FIG. 1B is block diagram illustrating a computer or controller 150 used by system 100 in field oriented controller 130 that controls power output without the need for measuring the position of a generator's rotor with hardware. The computer 150 includes a processor 152, memory 154 software (SW) 156, disk drives 158, user interface 160, network interface 162, and input/output 164. The processor 152 is preferably an intelligent hardware device, e.g., a central processing unit (CPU), a microcontroller, an application specific integrated circuit (ASIC), etc. The memory 154 is used to store any kind of information including short term data. The memory 154 can include random access memory (RAM), read-only memory (ROM), solid state devices, and the like. The memory 154 stores computer-readable, computer-executable software code 156 containing instructions that are configured to, when executed, cause the processor 152 to perform various functions described herein. For example, software code 156 can include instructions, as described with reference to FIGS. 2A-3B, that are used by the field oriented controller 130 to estimate the rotor position and output control values to regulate the DC power output from the inverter/rectifier 120. Alternatively, the software 156 may not be directly executable by the processor 152 but is configured to cause other devices or systems coupled to the computer 150 through the input/output 164, e.g., when compiled and executed, to perform the functions. The user interface 160 can include a keyboard, mouse, display, touch interface display, speaker, microphone, or the like.

The user interface 160 can be the primary way that users interact with the computer 150 and with other devices and systems coupled to the computer 150 through the input/output 164, both when inputting and receiving data. The network interface 162 is coupled to the processor 152 and the memory 154 and can be used by the computer 150 to interact with other computers on the network, servers, other devices, etc. The network interface 162 can include internet connections as well as intranet connections and is the primary way that computer 150 interacts with a network and with users requesting data or information. The network interface 162 can include connections for both wire and wireless connections. The user interface 160 is coupled to the processor 152 and the memory 154 and is used by a user to enter or retrieve information from the computer 150. Disk drives 158 are the primary storage medium used by computer 150 to store large amounts of information. However, large amounts of information can also be stored in other storage devices such as optical devices, solid state drives, etc. Disk drives 158 are intended to include other data storage devices and are not limited to only hard disk drives. For example, disk drives 158 can store data that is generated by external devices and transferred to the computer 150 through the input/output 164 and/or the network interface 162. In some embodiments, the external devices are power generators coupled to the computer 150 via the input/output 164 and the data transferred to the computer 150 is performance data, such as temperature, pressure, hours in operation, etc, that is produced by the generator. When computer 150 receives data from devices via the input/output 164 and/or the network interface 162, the data is either processed by processor 152 or stored in memory 154 or disk drives 158. Data that is processed is done using instructions stored in SW 156.

Figure 2A:
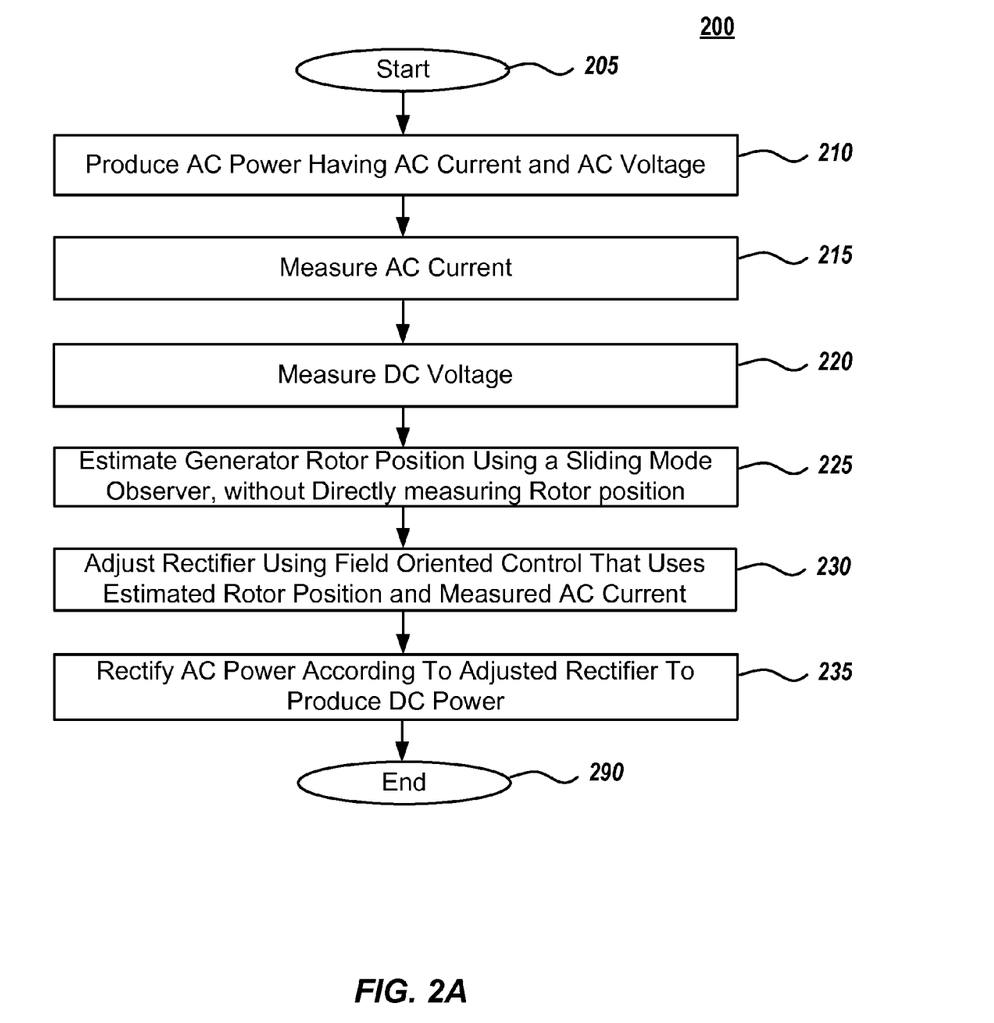
FIG. 2A is a flowchart illustrating operations used to convert AC power into DC power using a sensorless control technique that utilizes a sliding mode observer, in accordance with an embodiment.

FIG. 2A is a flowchart illustrating operations used by system 100 to convert AC power into DC power using a sensorless control technique that utilizes a sliding mode observer, in accordance with an embodiment. The process 200 begins in operation 205 where the AC generator 110, inverter/rectifier 120, and field oriented controller 130 are started and initialized. For example, the AC generator 110 is set to be driven by a motor to produce AC power and the rectifier/inverter 120 is set to output DC power in accordance with commands from the field oriented controller 130. In this operation the field oriented controller 130 can establish the electrical angular position (rotor position) estimate in advance, to avoid instability on power conversion or voltage regulation start-up. In some embodiments, operation 205 is optional and the process starts in operation 210. In operation 210, the AC generator 120 is driven by a motor or other mechanical mechanism to produce AC power characterized by an AC voltage and an AC current. In operation 215, the AC current produced by the AC generator 110 is measured using an ammeter. In operation 220, the DC voltage produced by the rectifier/inverter 120 is measured using a voltmeter.

Next in operation 225, the rotor position is estimated using a sliding mode observer. The rotor position is estimated without having to use sensors, such as Hall effect device sensors, to directly measure it. Sliding mode observers can be designed using sliding mode control techniques, which are nonlinear control methods that alter the dynamics of a nonlinear system by application of a high-frequency switching control. Sliding mode observers are nonlinear, have high gain and have the ability to bring the estimator dynamics to zero in finite time. Since the electrical angle or position of the rotor is being estimated, and not measured, using current (amps) measurements and commanded voltages, which are measured, a sliding mode observer can be used to estimate the position of the rotor. The sliding mode observer is also robust to disturbances in the system 100 and immune to the back EMF magnitude that varies with rotor speed. The sliding mode observer is used to estimate rotor position or electrical angle by driving the current error derived from stator current measurements and stator current estimates in the neighborhood of zero such that back EMF estimates may be extracted from the equivalent control values, as is further described with reference to FIGS. 2B, and 3A-3B. The back EMF estimates are compensated using speed-adaptive gain and low-pass filter structures and are used to calculate the rotor angle, as is also further described with reference to FIGS. 2B, and 3A-3B. The sliding mode observer can also be used to estimate the speed of the rotor in substantially the same manner.

Next in operation 230, the inverter/rectifier 120 is adjusted using an adjustment control value sent by the field oriented controller. The field oriented controller uses the estimated rotor position and the measured AC current to generate the control value that is provided to the inverter/rectifier 120. The control value can include values for adjusting the duty cycle on each leg of the rectifier by using PWM. The control value can be calculated using various methods including transforming the measured AC current into a two-dimensional stationary reference using a Clarke Transform, transforming the two-dimensional stationary reference into a rotating reference using a Park Transform that uses the rotor position, and transforming the rotating reference using an Inverse Park transform whose output goes to a SVPWM switch. The rotating reference can be a direct-quadrature frame. In this operation, the field oriented controller can adjust the inverter/rectifier 120 by providing a control value that adjusts the duty cycle using PWM to optimize power output and reduce error.

In operation 235 the AC power generated by the AC generator 110 is rectified by the inverter/rectifier 120 to produce a DC power output. The inverter/rectifier 120 can convert AC power to DC power by using IGBT or MOSFET devices that are turned ON and OFF, according to control signals received from the field oriented controller 130, so that only DC power is outputted. Operations 210-235 can continue to run in a loop indefinitely as system 100 adjusts during operations. For example, if the motor driving the AC generator 110 slows down or speeds up, the field oriented controller 130 can adjust the output control value sent to the inverter/rectifier 120 to change the PWM duty cycle so that the entire system 100 runs more efficiently. The process ends in operation 290 when the system 100 is powered down.

Figure 2B:
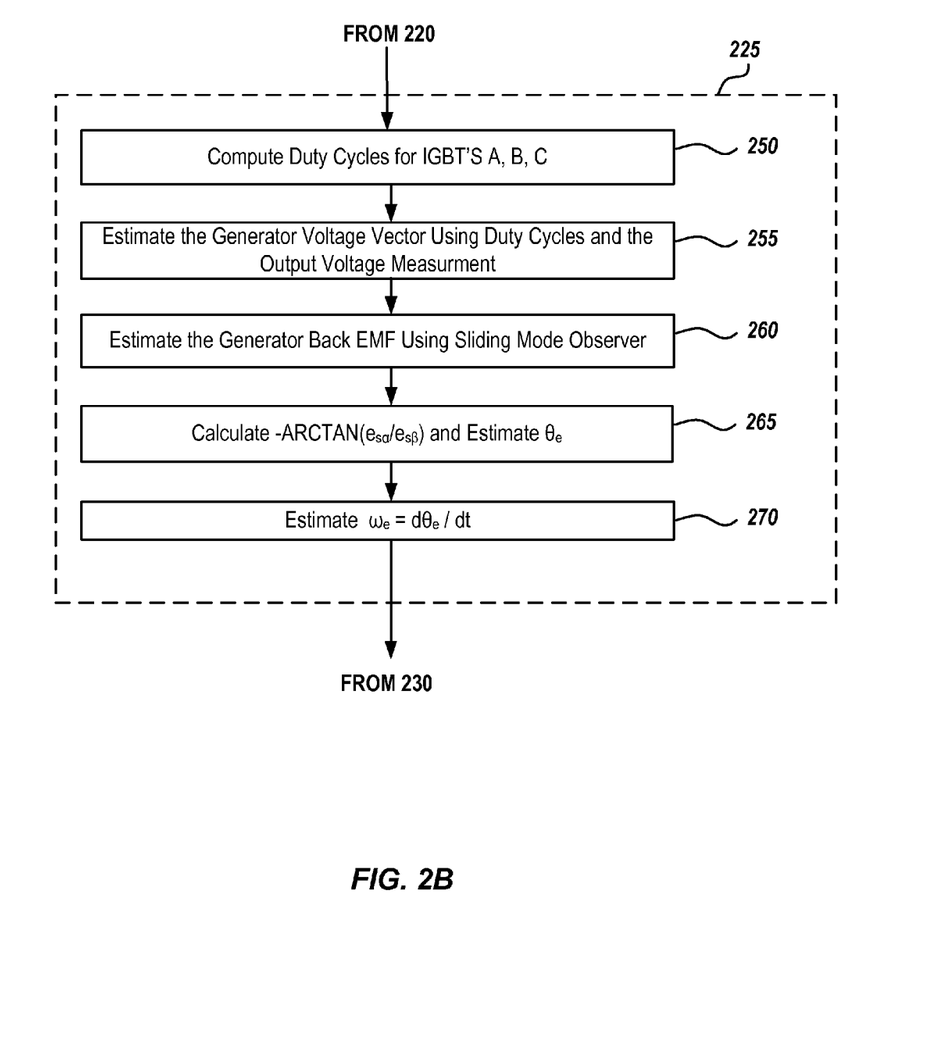
FIG. 2B is a flowchart illustrating operations used to estimate the rotor position and rotor speed without using hardware and as part of the sensorless control technique of FIG. 2A, in accordance with an embodiment.

FIG. 2B is a flowchart illustrating further details of operation 225, which is described with reference to FIG. 2A and is used to estimate the rotor position and rotor speed without using hardware, in accordance with an embodiment. As discussed in operation 225, the rotor position and rotor speed are estimated using a sliding mode observer that can use the operations provided in FIG. 2B. In operation 250, the duty cycle for each IGBT in inverter/rectifier 120 is first computed. Inverter/rectifier 120 includes at least one IGBT for each leg of the power generated by the AC generator 110. For example if the AC generator is a three-phase generator, then there are three IGBT devices, one for each leg. Next in operation 255, the AC generator voltage vector is estimated using the computed duty cycles and the measured DC output voltage produced by the rectifier. Next in operation 260, the back electromotive force (EMF) ($e_{s\alpha}$ and $e_{s\beta}$) is estimated using the sliding mode observer, which uses the estimated AC voltages. In operation 265, the rotor position ($\theta_e$) is estimated using $\theta_e = -\arctan(e_{s\alpha}/e_{s\beta})$. In operation 270, the rotor speed ($\omega_e$) in estimated using $\omega_e = d\theta_e/dt$. Additional details regarding the estimation of the rotor position and rotor speed are provided with reference to FIGS. 3A-3B. After the rotor position and rotor speed are estimated in operations 265 and 270, respectively, the process continues to operation 230 where the inverter/rectifier 120 is adjusted using control values generated by the field oriented controller 130.

Figure 3A:
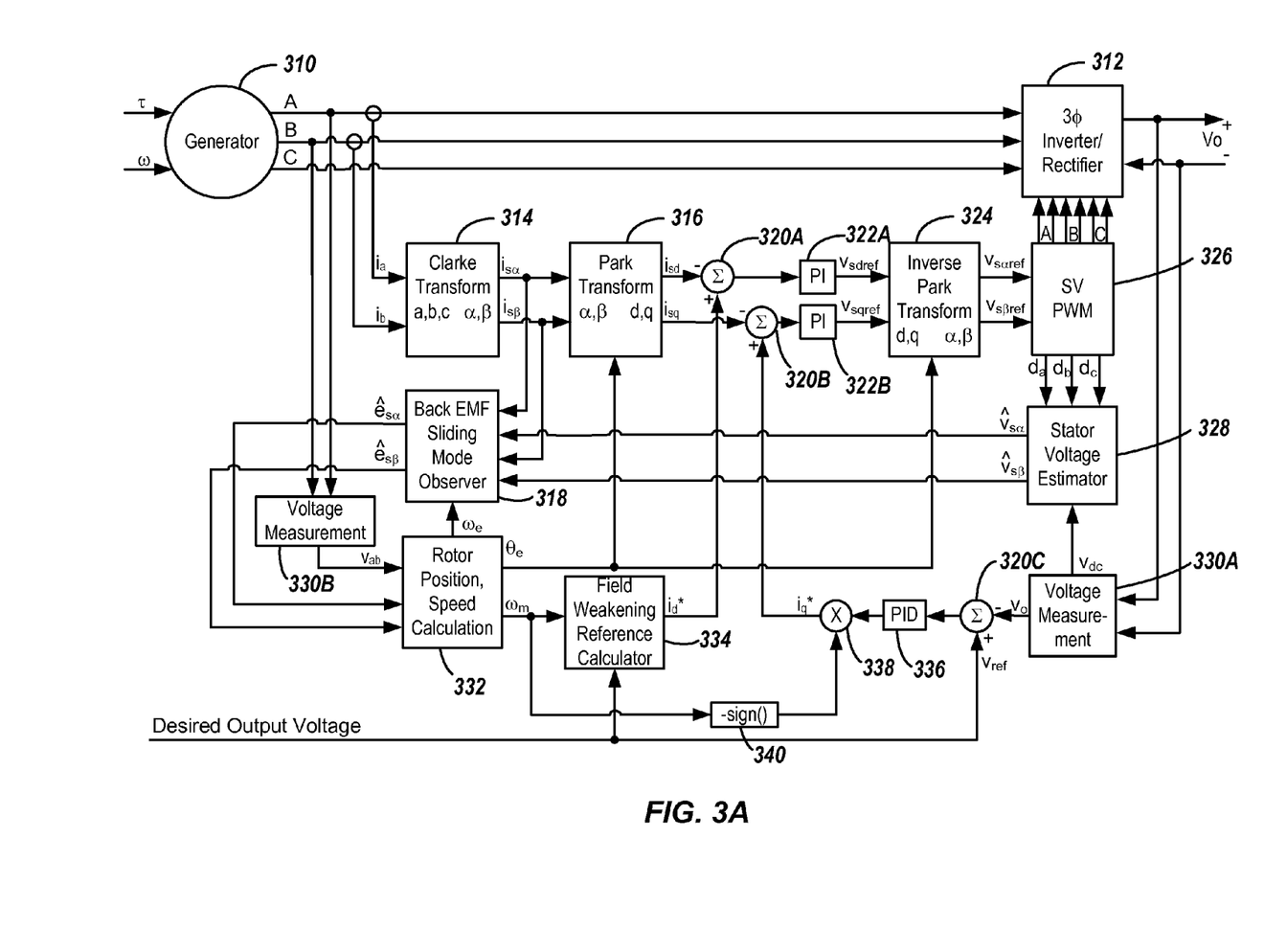
FIG. 3A is a system diagram of sensorless control utilizing a sliding mode observer, in accordance with an embodiment.

FIG. 3A is a system diagram showing how a field oriented controller algorithm is used to rectify AC power into DC power in a sensorless system that utilizes a sliding mode observer, in accordance with an embodiment. FIG. 3A illustrates the logic used to rectify AC power into DC power in a sensorless system and can be implemented in software or hardware such as electronic circuits including ASIC circuits, for example. A generator 310 is driven by a motor (not shown), which supplies a torque ($\tau$) at a frequency ($\omega$) on the generator. The AC generator 310 in turn produces an AC power output having three phases A, B, C. The AC power output from generator 310 is characterized by an AC voltage and AC current which are used to control the three phase inverter/rectifier 312. Current values $i_s$ and $i_b$ from at least two of the phases (phase A and phase B) of the three-phase generator are determined and sent to a Clarke transform 314, which uses these current values to calculate currents in the two-phase orthogonal stator axes. The two-phase orthogonal stator axis currents $i_{s\alpha}$ and $i_{s\beta}$, which are generated by the Clarke Transform 314 are sent to a Park Transform 316 and to a Back EMF Sliding Mode Observer 318. The Park Transform 316 transforms the two-phase orthogonal stator axis currents $i_{s\alpha}$ and $i_{s\beta}$, to the $I_{sd}$ and $I_{sq}$ current components in the d, q rotating frame.

Structures 320A and 320B subtract $i_{sd}$ and $i_{sq}$ measured currents from reference currents $i_d^*$ and $i_q^*$, respectively. The subtracted values are then transmitted to proportional plus integral (PI) controllers 322a and 322b, respectively. The PI controllers 322a and 322b then generate reference voltage outputs $V_{sdref}$ and $V_{sqref}$, respectively, which are then subjected to an Inverse Park Transform 324 to generate $V_{s\alpha ref}$ and $V_{s\beta ref}$. The SVPWM module 326 then uses the $V_{s\alpha ref}$ and $V_{s\beta qref}$ to generate duty cycle A ($d_a$), duty cycle B ($d_b$) and duty cycle C ($d_c$) and to generate pulse width modulation signals (six shown), which are sent into the three-phase inverter/rectifier 312. The Stator Voltage Estimator 328 then uses the duty cycle A ($d_a$), duty cycle B ($d_b$), duty cycle C ($d_c$) and the measured output voltage $V_{dc}$ of the three-phase inverter/rectifier 312 to estimate the stator voltage $V_{s\alpha}$ and $V_{s\beta}$. The output voltage $V_{dc}$ of the three phase inverter/rectifier 312 is measured using a Voltage Measurement Apparatus 330A. A sliding mode observer 318 then calculates a back Electromotive Force (EMF), $e_{s\alpha}$ and $e_{s\beta}$, using the estimated stator voltage $V_{s\alpha}$ and $V_{s\beta}$ and the two-phase orthogonal stator axis currents $i_{s\alpha}$ and $i_{s\beta}$.

A rotor position and speed calculator 332 then determines an estimate of the rotor position ($\theta_e$), an estimate of the rotor speed ($\omega_e$), and a mechanical rotor speed ($\omega_m$) based on the back EMF, $e_{s\alpha}$ and $e_{s\beta}$, and the generator voltage $V_{ab}$, as measured using a Voltage Measurement Apparatus 330B. A Field Weakening Reference Calculator 334 then determines field reference current $i_d^*$ based on the mechanical rotor speed ($\omega_m$) and a desired output voltage. The reference current $i_{di}^*$ is determined by using a summer 320C to add the measured voltage $V_o$ and the reference voltage $V_{ref}$ and subjecting the added value to a proportional-integral-derivative controller (PID) 336 and then using a multiplier 338 to multiply the output of PID 336 with the mean rotor speed ($\omega_m$), after the rotor speed sign has been changed using sign 340.

Figure 3B:
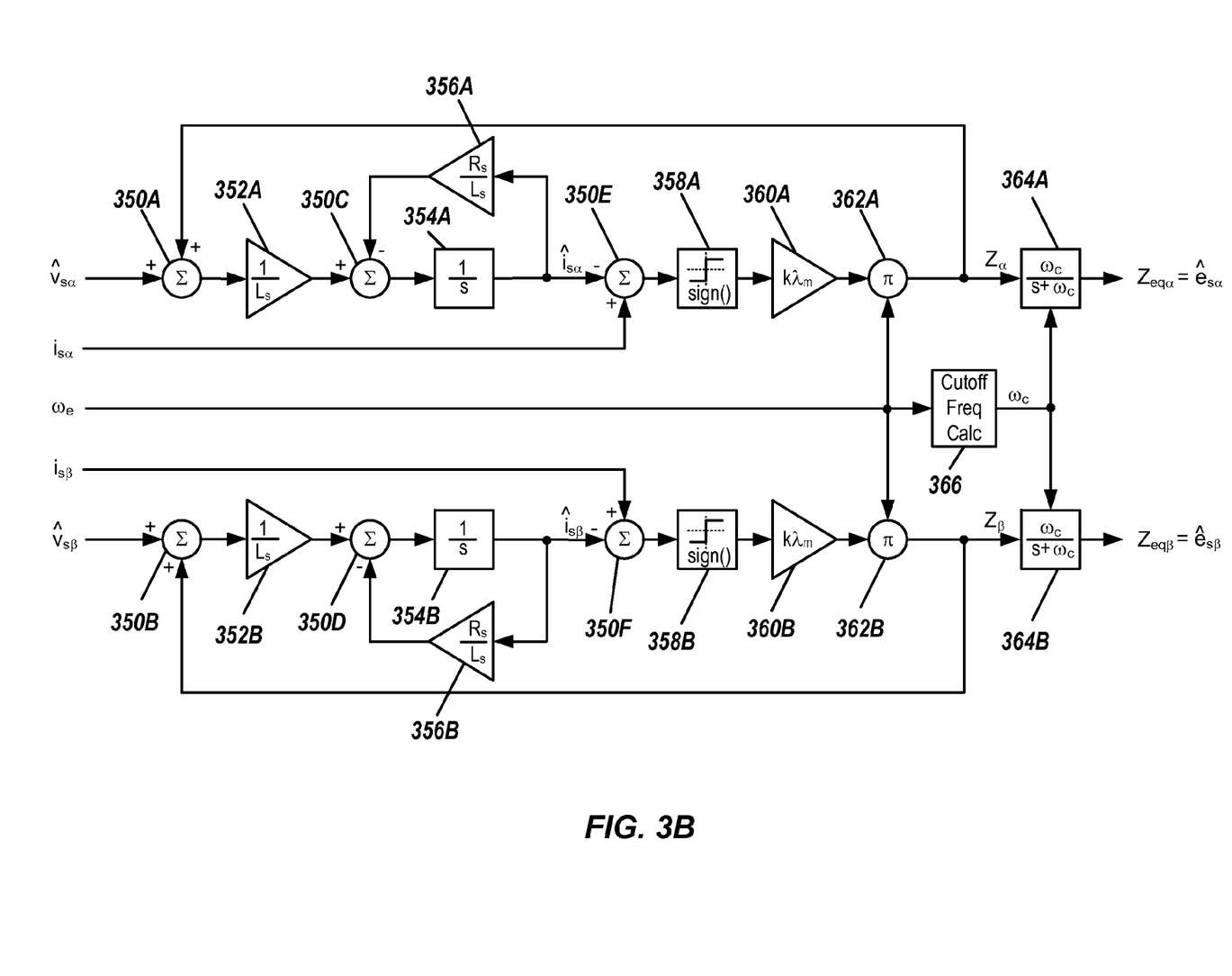
FIG. 3B is a sliding mode observer control structure diagram for sensorless control utilizing a sliding mode observer, in accordance with an embodiment.

FIG. 3B is a system diagram showing further details of how the back EMF sliding mode observer 318, shown in FIG. 3A, estimates the back EMF ($e_{s\alpha}$ and $e_{s\beta}$) using the estimated stator voltage $V_{s\alpha}$ and $V_{s\beta}$ the two-phase orthogonal stator axis currents $i_{s\alpha}$ and $i_{s\beta}$ the estimated rotor speed ($\omega_e$) and the measured generator parameters, stator inductance ($L_s$) and stator resistance ($R_s$). FIG. 3B illustrates the logic used to estimate the back EMF and can be implemented in software or hardware, e.g., a central processing unit (CPU), a microcontroller, electronic circuits, an application specific integrated circuit (ASIC), etc., for example. The system diagram of the back EMF sliding mode observer 318 estimates the back EMF ($e_{s\alpha}$ and $e_{s\beta}$) by performing the following calculations on the input estimated stator voltage $V_{s\alpha}$ and $V_{s\beta}$ the two-phase orthogonal stator axis currents $i_{s\alpha}$ and $i_{s\beta}$ and the estimated rotor speed ($\omega_e$):

$$\begin{bmatrix} \frac{d\hat{i}_\alpha}{dt} \\ \frac{d\hat{i}_\beta}{dt} \end{bmatrix} = \begin{bmatrix} -\frac{R_s}{L_s} & 0 \\ 0 & -\frac{R_s}{L_s} \end{bmatrix} \begin{bmatrix} \hat{i}_\alpha \\ \hat{i}_\beta \end{bmatrix} + \begin{bmatrix} \frac{1}{L_s} & 0 \\ 0 & \frac{1}{L_s} \end{bmatrix} \begin{bmatrix} \hat{v}_\alpha + l \cdot Z_\alpha \\ \hat{v}_\beta + l \cdot Z_\beta \end{bmatrix}$$

where $$\begin{bmatrix} Z_\alpha \\ Z_\beta \end{bmatrix} = \begin{bmatrix} -\mathrm{sign}(\hat{i}_\alpha - i_\alpha) \\ -\mathrm{sign}(\hat{i}_\beta - i_\beta) \end{bmatrix}$$

The estimated stator voltage $V_{s\alpha}$ and $V_{s\beta}$ are first added to $Z_\alpha$ and $Z_\beta$, respectively in summers 350A and 350B, respectively. The added values from 350A and 350B are then multiplied by 1/Ls in operations 352A and 352B, respectively. These values are then processed by summers 350C and 350D, respectively. Summer 350C adds the output of 352A with the output of 356A and summer 350D adds the output of 352B with the output of 356B. The outputs of summers 350C and 350D are integrated by 354A and 354B, respectively, and are each then subjected to another set of summers 350E and 350F. The outputs of summers 350E and 350F are processed by the signum operator in 358A and 358B, respectively, and then by the $k\lambda_m$, (where k is the high frequency gain and $\lambda_m$ is the generator magnetic flux linkage), operator in 360A and 360B, respectively. The outputs of operators 360A and 360B are then multiplied by the product operator 364A and 364B, respectively. Finally, the outputs of product operators 362A and 362B are processed by the low pass filter (LPF) operators 364A and 364B respectively and generate the back EMF ($e_{s\alpha}$ and $e_{s\beta}$) respectively. Operation 366 calculates the cutoff frequency ($\omega_c$) of the LPF using the estimated rotor speed ($\omega_e$). The rotor speed ($\omega_e$) is used by the product operators 362A and 362B whereas the cutoff frequency is used by operators 364A and 364B, respectively, to generate the back EMF estimates ($e_{s\alpha}$ and $e_{s\beta}$). The back EMF estimates are then used by the field oriented controller 130 to estimate the rotor position and/or rotor angle and generate control values for regulating the inverter/rectifier 130 to produce stable regulated DC power output.

Although specific embodiments of the invention have been described, various modifications, alterations, alternative constructions, and equivalents are also encompassed within the scope of the invention. The described invention is not restricted to operation within certain specific embodiments, but is free to operate within other embodiments configurations as it should be apparent to those skilled in the art that the scope of the present invention is not limited to the described series of transactions and steps.

It should be understood that the present technology as described above can be implemented in the form of control logic using computer software in a modular or integrated manner. Based on the disclosure and teachings provided herein, a person of ordinary skill in the art will know and appreciate other ways and/or methods to implement the present technology using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the technology will become apparent to those skilled in the art upon review of the disclosure. The scope of the technology should, therefore, be determined not with reference to the above description, but instead should be determined with reference to the pending claims along with their full scope or equivalents.

One or more features from any embodiment may be combined with one or more features of any other embodiment without departing from the scope of the technology.

A recitation of "a", "an" or "the" is intended to mean "one or more" unless specifically indicated to the contrary.

What is claimed is:

1. A method comprising:
   producing an alternating current (AC) power using a generator;
   measuring an AC current produced by the generator;
   estimating a rotor position of the generator using a sliding mode observer, without directly measuring the rotor position;
   calculating a control value for adjusting a rectifier, the control value is calculated using the estimated rotor position and the measured AC current;
   rectifying the AC power according to the control value to produce a direct current (DC) power; and
   measuring a DC output voltage produced by the rectifier, wherein estimating the rotor position of the generator using a sliding mode observer further comprises:
      computing a duty cycle of each leg of the AC power produced by the generator;
      estimating an AC voltage produced by the generator using the computed duty cycles and the measured DC output voltage produced by the rectifier;
      estimating a back electromotive force (EMF) using the sliding mode observer that uses the estimated AC voltages; and
      estimating the rotor position using the estimated back EMF.

2. The method of claim 1 further comprising estimating the rotor speed.

3. The method of claim 1 wherein adjusting the rectifier further comprises adjusting the duty cycle on each leg of the rectifier using pulse width modulation (PWM).

4. The method of claim 1, wherein rectifying the AC power further comprises: adjusting a gain using an adaptive gain algorithm based on the speed of the shaft of the generator.

5. The method of claim 1, wherein the generator is a three phase generator.

6. A method comprising:
   producing an alternating current (AC) power using a generator;
   measuring an AC current produced by the generator;
   estimating a rotor position of the generator using a sliding mode observer, without directly measuring the rotor position;
   calculating a control value for adjusting a rectifier, the control value is calculated using the estimated rotor position and the measured AC current; and
   rectifying the AC power according to the control value to produce a direct current (DC) power,
   wherein calculating the control value for adjusting the rectifier further comprises:
      transforming the measured AC current into a two-dimensional stationary reference using a Clarke Transform;
      transforming the two-dimensional stationary axis into a rotating reference using a Park Transform that uses the rotor position; and
      transforming the rotating reference using an Inverse Park Transform, the output of which goes to a Space Vector Pulse Width Modulation (SVPWM) switch.

7. The method of claim 6 wherein the rotating reference is a direct-quadrature frame.

8. The method of claim 6 wherein rectifying the AC power further comprises adjusting a duty cycle using pulse width modulation (PWM) to optimize power output and reduce error.

9. A system for generating direct current (DC) power, comprising:
   an alternating current (AC) generator for producing AC power characterized by an AC current and an AC voltage;
   an ammeter that measures the AC current produced by the generator;
   a rectifier that coverts the AC power into DC power; and
   a field oriented controller that adjusts the rectifier to operate efficiently, wherein the field oriented controller comprises a memory device including instructions that, when executed cause the field oriented controller to:
      estimate a rotor position of the generator using a sliding mode observer that does not directly measure the rotor position;
      provide an adjustment to the rectifier that is based on the estimated rotor position and the measured AC current; and
   a voltmeter that measures a DC output voltage produced by the rectifier; and
   wherein the instructions that estimate the rotor position of the generator further comprise instructions that cause the field oriented controller to:
      compute a duty cycle of each leg of the AC power produced by the generator;
      estimate an AC voltage produced by the generator using the computed duty cycles and the measured DC output voltage produced by the rectifier;
      estimate a back electromotive force (EMF) using the sliding mode observer that uses the estimated AC voltages; and
      estimate the rotor position using the estimated back EMF.

10. The system of claim 9 wherein the instructions further comprise instructions that cause the field oriented controller to estimate the rotor speed.

11. The system of claim 9 wherein the instructions that provide an adjustment to the rectifier further comprise instructions that cause the field oriented controller to adjust the duty cycle on each leg of the rectifier using pulse width modulation (PWM).

12. The system of claim 9, wherein the AC generator is a three phase generator.

13. The system of claim 9, wherein the memory device including instructions is a computer readable medium.

14. A system for generating direct current (DC) power, comprising:
   an alternating current (AC) generator for producing AC power characterized by an AC current and an AC voltage;
   an ammeter that measures the AC current produced by the generator;
   a rectifier that coverts the AC power into DC power; and
   a field oriented controller that adjusts the rectifier to operate efficiently, wherein the field oriented controller comprises a memory device including instructions that, when executed cause the field oriented controller to:
estimate a rotor position of the generator using a sliding mode observer that does not directly measure the rotor position; and
provide an adjustment to the rectifier that is based on the estimated rotor position and the measured AC current, wherein the instructions that provide an adjustment to the rectifier further comprise instructions that cause the field oriented controller to:
transform the measured AC current into a two-dimensional stationary reference using a Clarke Transform;
transform the two-dimensional stationary reference into a rotating reference using a Park Transform that uses the rotor position; and
transform the rotating reference using an Inverse Park Transform, the output of which goes to a Space Vector Pulse Width Modulation (SVPWM) switch.

15. The system of claim 14 wherein the rotating reference is a direct-quadrature frame.

16. The system of claim 14 wherein the instructions that provide an adjustment to the rectifier further comprise instructions that cause the field oriented controller to adjust a duty cycle using pulse width modulation to optimize power output and reduce error.

17. A system for generating direct current (DC) power, comprising:
an alternating current (AC) generator for producing AC power characterized by an AC current and an AC voltage;
an ammeter that measures the AC current produced by the generator;
a rectifier that coverts the AC power into DC power;
a field oriented controller that adjusts the rectifier to operate efficiently, wherein the field oriented controller comprises logic that causes the field oriented controller to:
estimate a rotor position of the generator using a sliding mode observer that does not directly measure the rotor position; and
provide an adjustment to the rectifier that is based on the estimated rotor position and the measured AC current; and
a voltmeter that measures a DC output voltage produced by the rectifier,
wherein the logic that causes the field oriented controller to estimate the rotor position of the generator further comprises logic that causes the field oriented controller to:
compute a duty cycle of each leg of the AC power produced by the generator;
estimate an AC voltage produced by the generator using the computed duty cycles and the measured DC output voltage produced by the rectifier;
measure a DC output voltage produced by the rectifier;
estimate a back electromotive force (EMF) using the sliding mode observer that uses the estimated AC voltages; and
estimate the rotor position using the estimated back EMF.

18. The system of claim 17 wherein the logic further comprises logic that causes the field oriented controller to estimate the rotor speed.

19. The system of claim 17 wherein the logic that provides an adjustment to the rectifier further comprises logic that causes the field oriented controller to adjust the duty cycle on each leg of the rectifier with a pulse width modulation (PWM).

20. The system of claim 17, wherein the AC generator is a three phase generator.

21. The system of claim 17, wherein the logic is a circuit.

22. The system of claim 17, wherein the logic is a set of instructions executable by a processor, the set of instructions is stored in a memory that is accessible by the processor.

23. A system for generating direct current (DC) power, comprising:
an alternating current (AC) generator for producing AC power characterized by an AC current and an AC voltage;
an ammeter that measures the AC current produced by the generator;
a rectifier that coverts the AC power into DC power; and
a field oriented controller that adjusts the rectifier to operate efficiently, wherein the field oriented controller comprises logic that causes the field oriented controller to:
estimate a rotor position of the generator using a sliding mode observer that does not directly measure the rotor position; and
provide an adjustment to the rectifier that is based on the estimated rotor position and the measured AC current,
wherein the logic that provides an adjustment to the rectifier further comprises logic that causes the field oriented controller to:
transform the measured AC current into a two-dimensional stationary reference using a Clarke Transform;
transform the two-dimensional stationary reference into a rotating reference using a Park Transform that uses the rotor position; and
transform the rotating reference using an Inverse Park Transform, the output of which goes to a Space Vector Pulse Width Modulation (SVPWM) switch.

24. The system of claim 23 wherein the rotating reference is a direct-quadrature frame.

25. The system of claim 23 wherein the logic that provides an adjustment to the rectifier further comprises logic that causes the field oriented controller to adjust a duty cycle using pulse width modulation (PWM) to optimize power output and reduce error.

* * * * *

UNITED STATES PATENT AND TRADEMARK OFFICE
CERTIFICATE OF CORRECTION

PATENT NO. : 8,659,923 B2  
APPLICATION NO. : 13/028026  
DATED : February 25, 2014  
INVENTOR(S) : Justin L. Owen, Jeffrey C. Strouse and Michael J. Marcel It is certified that error appears in the above-identified patent and that said Letters Patent is hereby corrected as shown below:

In the Claims

Claim 9, column 12, line 20, delete "coverts"; and insert --converts--;
Claim 14, column 12, line 65, delete "coverts"; and insert --converts--;
Claim 17, column 13, line 34, delete "coverts"; and insert --converts--;
Claims 23, column 14, line 27, delete "coverts"; and insert --converts--.

Signed and Sealed this
Twenty-seventh Day of May, 2014

Michelle K. Lee
*Deputy Director of the United States Patent and Trademark Office*